US008617635B2

(12) United States Patent
Hanselmann (10) Patent No.: US 8,617,635 B2
(45) Date of Patent: Dec. 31, 2013

(54) CHOCOLATE PRODUCTS CONTAINING AMORPHOUS SOLIDS AND METHODS OF PRODUCING SAME

(75) Inventor: William Hanselmann, Hershey, PA (US)

(73) Assignee: The Hershey Company, Hershey, PA (US)

( * ) Notice: Subject to any disclaimer, the term of this patent is extended or adjusted under 35 U.S.C. 154(b) by 912 days.

(21) Appl. No.: 11/141,382

(22) Filed: Jun. 1, 2005

(65) Prior Publication Data

US 2006/0286272 A1    Dec. 21, 2006

(51) Int. Cl.
*A23G 1/00*    (2006.01)

(52) U.S. Cl.
USPC .......................... 426/631; 426/659; 426/660

(58) Field of Classification Search
USPC .......................................... 426/631, 659, 660
See application file for complete search history.

(56) References Cited

U.S. PATENT DOCUMENTS

| 3,218,174 | A | * | 11/1965 | Schubiger et al. ............ 426/660 |
|---|---|---|---|---|
| 4,084,011 | A | | 4/1978 | Chevalley et al. |
| 4,307,126 | A | | 12/1981 | Sano et al. |
| 4,762,725 | A | | 8/1988 | Player et al. |
| 5,087,461 | A | | 2/1992 | Levine et al. |
| 5,126,160 | A | | 6/1992 | Giddey et al. |
| 6,010,735 | A | | 1/2000 | Frippiat et al. |
| 6,261,627 | B1 | | 7/2001 | Armstrong et al. |
| 6,337,082 | B1 | | 1/2002 | Fuisz et al. |
| 6,548,099 | B1 | | 4/2003 | Baker et al. |
| 2001/0012536 | A1 | | 8/2001 | Armstrong et al. |
| 2004/0126472 | A1 | | 7/2004 | Soldani |

FOREIGN PATENT DOCUMENTS

| DE | 1929447 | 1/1970 |
|---|---|---|
| EP | 0 297 054 B1 | 6/1988 |
| EP | 0 401 427 B1 | 12/1989 |
| EP | 0 646 650 A2 | 9/1994 |
| EP | 0 958 747 A1 | 5/1998 |
| WO | WO 99/07901 | 6/1998 |

OTHER PUBLICATIONS

Walstra, Pieter. 2001. Physical Chemistry of Foods. Marcel Dekker, Inc., New York, p. 654.*
Gabarra, P. 1998. Journal of Food Science 64(3)523.*
Ziegleder, G. et al. 2004. Lebnesm-Wiss. u. Technolog 37:771-778.*
Ziegleder, G. et al. 2004. Lebnesm-Wiss. u. Technolog 37:649-656.*
Chenoweth, Walter W. 1936. How to Make Candy. The Macmillan Company, New York. p. 94-97, 100, 156-159, 165-166.*
Igoe, R. 1989. Dictionary of Food Ingredients. Van Nostrand Reinhold, New York. p. 45.*
Beckett, S. T. 1994. Industrial Chocolate Manufacture and Use, 2nd edition. Blackie Academic & Professional, New York. p. 148.*
PCT International Application US2006/021130, Notification Concerning Transmittal of International Preliminary Report on Patentability dated Dec. 21, 2007 with the Written Opinion of International Searching Authority.
E.A. Niediek, Ph.D.; Amorphous Sugar, Its Formation and Effect on Chocolate Quality, The Manufacturing Confectioner/Jun. 1991, pp. 91-95.
E.A. Niediek, Karlsrube, Uber Eigenschaftsunterschiede zwischen der kristallinen und amorphen Form von Saccharose und Lactose Differences in properties between the crystalline and amorphous forms of sucrose and lactose, ZFL Mar. 1982 pp. 173-185.
Heiko K. Cammenga and Karin Gehrich, Amorphous Sugars: Problem or Chance?, Tehnical University of Braunschweig, Germany, 30 page presentation.
S.T. Beckett Nestle, Industrial Chocolate Manufacture and Use, Blackwell Science 3rd Edition 1999, pp. 45-258.
Albert Zumbe, Adam Lee and David Storey, Polyols in confectionery: the route to sugar-free, reduced sugar and reduced calorie confectionery, British Journal of Nutrition (2001), 85, Suppl, 1, S32-S45.
Shamblin Zografi; The effects of absorbed water on the properties of amorphous mixtures containing sucrose, Pharm. Res 1999 16(7): 1119-24 Abstract.
RD Ludescher, NK Shah, CP McCaul, KV Simon; Beyond Tg: optical luminescence measurements of molecular mobility in amorphous solid foods, Food Hydrocolloids, 2001 15: 331-339 Abstract.
D.J. Van Drooge, W.L.J. Hinrichs, H.W. Frijlink, Incorporation of Lipophilic Drugs in Sugar Glasses by Lyophilization using a Mixture of Water and Tertiary Butyl Alcohol as Solvent, Journal of Pharmaceutical Sciences, vol. 93, No. 3, Mar. 2004, pp. 713-725.
Minifie, B. W., Chocolate, Cocoa, And Confectionery, Chocolate Manufacture, Aspen Publishers, 3rd Edition, pp. 135-164.
H. Gloria and D. Sievert, Changes in the Physical State of Sucrose during Dark Chocolate Processing, J. Agric. Food Chem. 2001, 49, pp. 2433-2436.
International Search Report and Written Opinion of International Search Authority in PCT/US 06/21130, dated Aug. 10, 2007.
Liang, B., et al., "Effects of Milk Powders in Milk Chocolate", J. Dairy Sci., vol. 87, No. 1, pp. 20-31, (2004).

* cited by examiner

*Primary Examiner* — Carolyn Paden
(74) *Attorney, Agent, or Firm* — Wiley Rein LLP (57) ABSTRACT

The invention relates to novel food, confectionery, and chocolate compositions and methods of producing them. In one embodiment, an amorphous sugar, such as a corn syrup solid, wholly or partially replaces crystalline sugar in the chocolate composition. In a second embodiment, an amorphous sugar is combined with cocoa solids, milk solids and/or fruit purees and incorporated into a chocolate product or composition. In a further embodiment, the invention relates to a chocolate composition comprising amorphous sugar and crystallized sugar wherein the ratio of amorphous sugar to crystallized sugar is such that the combination of amorphous sugar and crystallized sugar has a glass transition temperature of at least room temperature and amorphous sugar is detectable in the final product or composition.

24 Claims, 7 Drawing Sheets

(5 of 7 Drawing Sheet(s) Filed in Color)

CHOCOLATE PRODUCTS CONTAINING AMORPHOUS SOLIDS AND METHODS OF PRODUCING SAME

FIELD OF THE INVENTION AND INTRODUCTION

The invention relates to food and/or confectionery compositions containing amorphous sugar wherein amorphous sugar either fully or partially replaces crystalline sugar during the production of compositions or ingredients or during the manufacture of chocolate products, coatings, fillers, or other chocolate food or confectionery ingredients. In one embodiment, the invention relates to a chocolate composition comprising amorphous sugar and crystallized sugar wherein the ratio of amorphous sugar to crystallized sugar is such that the combination has a glass transition temperature of at least room temperature. An amorphous sugar or combinations of amorphous sugars can also completely replace crystalline sugar or be added separately from crystalline sugar in the production of a chocolate product or composition. In a further embodiment, amorphous sugar is combined with milk solids, cocoa solids and/or fruit purees or extracts, dried to a glass state having a glass transition temperature (Tg) of at least room temperature and incorporated into a cocoa-containing product or chocolate. The invention further relates to methods of producing confectionery, food, and chocolate compositions containing amorphous sugar, where the amorphous structure can be detected in the composition.

BACKGROUND

Chocolate compositions are typically produced using crystalline sugar, such as sucrose. Amorphous sugar is not used in the production of chocolate because of its water content. (Industrial Chocolate Manufacture and Use, 3d Ed., S. T. Beckett, ed., 1999, at 45). Also, amorphous sugar is capable of absorbing water from the environment and other chocolate ingredients, creating potential difficulties during processing and storage. For example, Minifie notes that anhydrous corn syrup is very hygroscopic and can cause trouble with moisture absorption during refining. (Bernard W. Minifie, Chocolate, Cocoa, and Confectionery, 3d ed., Aspen Publishers, Inc., 1999, at 136). Furthermore, the amorphous state can be unstable, and amorphous sugars, such as sucrose, dextrose of lactose, tend to rapidly crystallize in the presence of moisture and/or release moisture from crystallization, which can negatively impact the interaction with other components. In addition, the addition of water to chocolate compositions results in an unacceptable gummy texture in the mouth. Small amounts of added water can cause severe rheological changes in the product and can lead to an unacceptable eating texture. (see Minifie, Chocolate, Cocoa, and Confectionery, 3d ed., Aspen Publishers, Inc., 1999). Contrary to these observations, the present invention demonstrates that the full or partial replacement of crystalline sugar with amorphous sugar can produce acceptable chocolate compositions with the same behavior as conventional chocolate compositions. Some of the achievable benefits of replacing with amorphous sugar are a cost reduction, a decrease in calories, or a higher resistance to oil migration, for example in a peanut butter filled chocolate composition, and/or a higher resistance to water migration.

SUMMARY OF THE INVENTION

In a general aspect, the invention relates to novel food, confectionery, and especially chocolate compositions, and methods of producing them, where an amorphous sugar, such as a corn syrup solid, wholly or partially replaces a crystalline sugar ingredient. In one aspect or embodiment, an amorphous sugar is combined with cocoa solids, milk solids or fruit purees or extracts and incorporated into a chocolate product or composition. The chocolate products or compositions can be used as coatings, fillers, enrobing compositions, or other ingredients in a finished or final food or confectionery product. In a further aspect or embodiment, the invention relates to a chocolate composition comprising amorphous sugar and crystallized sugar, wherein the ratio of amorphous sugar to crystallized sugar is such that the combination of amorphous sugar and crystallized sugar has a glass transition temperature of at least room temperature. In general, the amorphous sugar is detectable in the final product or composition and characteristic microstructures of the chocolate compositions in particular are defined below. Some of the many benefits of the invention include cost reduction, a decrease in calories, and/or a higher resistance to oil or water migration in food, chocolate, or confectionery products and during the storage of them.

In another general aspect, the invention encompasses the use of a characteristic glass transition temperature at different moisture contents for a variety of ratios of crystalline sugar: amorphous sugar in chocolate compositions, as well as the use of related information to modify the properties and contents of food products and compositions and/or improve manufacturing conditions or manufactured products. The resulting improvements and implications on food manufacturing and preparation systems allows one of ordinary skill in the art to, for example, vary compositions from a glassy to a rubbery state, modify the water content of foods and related compositions, and modify the processing conditions for food and especially chocolate products. Advantageously, water can be used to a higher extent than in conventional chocolate processing and less expensive amorphous sugars can replace crystalline sucrose, for example, while still retaining the melting properties and mouthfeel properties known to chocolate and milk chocolate compositions. Several techniques can be used to measure the glass transition and any available or appropriate technique can be used, including differential scanning calorimetry (DSC) and dynamic mechanical thermal analysis (DMTA).

The present invention also relates to specific chocolate compositions wherein amorphous sugar either wholly or partially replaces crystalline or crystallized sugar as an ingredient. The invention further relates to chocolate compositions wherein amorphous sugar is combined with milk solids, cocoa solids or fruit purees or fruit extracts and dried to a glass transition temperature (Tg) of greater than room temperature, or about 20° C., or about 25° C., or higher. The invention also relates to methods of producing chocolate compositions using amorphous sugar.

In one embodiment, the invention relates to a mixture or composition comprising about 45% by weight sugar, 45% by weight cocoa powder, and 10% by weight water as a composition having an amorphous solid that can be used in producing a chocolate or confectionery product or ingredient. The sugar component of the mixture or composition can consist entirely of amorphous sugar or a combination of amorphous sugar and crystalline sugar. In this and other embodiments or in mixing sugar to create a chocolate, the ratio of amorphous sugar to crystalline sugar in the sugar ingredient can vary, for example from about 5:95, or about 10:90, or about 20:80, or about 30:70, or about 40:60, or about 50:50, or about 60:40, or about 70:30, or about 80:20, or about 90:10, or about 95:5, or 100:0, or any ratio in between these. In addition, the invention relates in general to sweetener compositions to be used in confectionery or food products comprising amorphous sugar and crystalline sugar wherein the ratio of amorphous sugar to crystalline sugar is such that the combination has a glass transition temperature of at least room temperature, or about 21° C., or about 25° C., or higher. For chocolate compositions in particular, any type of chocolate and chocolate under any desired standard of identity can be selected, such as milk chocolate, white chocolate, bittersweet chocolate, semisweet chocolate, and others.

Thus, the invention comprises a confectionery or food composition or ingredient comprising cocoa powder or cocoa liquor, a fat or cocoa butter equivalent, and up to about 50% sugar, wherein the crystalline sugar present is at least partially replaced by an amorphous sugar and the ratio of amorphous sugar to crystalline sugar present in the composition results in a glass transition temperature (Tg) of the composition or ingredient of about room temperature, or about 21° C. or higher. As shown in the Figures, an amorphous microstructure can be detectable in the composition or ingredient, by for example microscopy, and can be identified by contrast with a crystalline material under microscopy. A preferred amorphous sugar comprises a corn syrup solid and in particular corn syrup solid DE 42. However, the amorphous sugar can comprises one or more of corn syrup solids DE 20, DE 28, DE 36, DE 42, DE 43, DE 90, and DE 95, maltose corn syrup DE 65, polydextrose, and inulin. Any of the chocolate compositions or ingredients of the invention can further comprise an emulsifier, such as a lecithin, and/or polyglycerol polyricinoleates (PGPR). Also, especially for milk chocolate compositions, coatings and ingredients, any composition of the invention can comprise a milk powder or one or more milk solids. In any embodiment where chocolate is employed, a cocoa product, powder or liquor can comprises an enhanced level of polyphenols or antioxidants, as known in the art.

In general, the compositions of the invention wherein the amorphous sugar is present can comprise amorphous sugar produced from a fruit puree, or additionally comprise a fruit puree or fruit extract. Any fruit or berry can be selected for such use. As shown in the Examples below, the fruit puree composition can be dried to a desired moisture level and then optionally ground into a pulverized powder before being used as an ingredient in a food or confectionery product or composition. In addition, any ingredient or composition of the invention can comprise or additionally comprise one or more carbohydrate sweeteners, nutritive sweeteners, or non-nutritive sweeteners.

In another general aspect, the invention comprises a method of producing a chocolate or milk chocolate composition containing amorphous sugar comprising: (a) combining water, one or more of chocolate, cocoa powder or cocoa liquor, optionally one or more of a milk powder or non-fat milk powder, and a sweetener composition comprising crystalline sugar and an amorphous sugar; and (b) heating until the water evaporates to a desired level of viscosity or to about 50 C or higher, wherein the sweetener composition contains or comprises at least sugar composition in a particular ratio of crystalline sugar to amorphous sugar, and wherein the water content and/or sugar:amorphous sugar content results in a product having a glass transition temperature (Tg) of about of about 21° C. or higher. In these compositions, the amorphous sugar can be detectable through microscopy, for example. The method can further comprise mixing in a cocoa butter or a composition comprising a cocoa butter or a vegetable fat or a cocoa butter equivalent. In a preferred embodiment, the composition or method employs a sweetener composition having a crystalline sugar to corn syrup solids DE 42 ratio of about 50:50. The method or composition can further comprise adding or having a fruit puree or an extract from a fruit puree. As noted before, the method of the invention can use one or more of corn syrup solids DE 20, DE 28, DE 36, DE 42, DE 43, DE 90 to DE 95, maltose corn syrup DE 65, polydextrose, and inulin.

In another general aspect, the invention comprises a method of producing a chocolate composition containing amorphous sugar comprising: (a) selecting a sugar composition having a particular ratio of crystalline sugar to amorphous sugar wherein the ratio results in a composition having a glass transition temperature (Tg) of at least room temperature or at least about 20° C. or at least about 21° C. or least about 25° C.; (b) incorporating the sugar composition having a combination of crystalline sugar and amorphous sugar into a cocoa product and a fat and optionally an emulsifier to produce a chocolate composition. The method can further comprise adding one of more of milk powder, non-fat milk powder, or a milk product to produce a milk chocolate composition. The method can use a fat and particularly cocoa butter, vegetable fats, or cocoa butter equivalents, or combinations of them. The ratio of crystalline sugar to amorphous sugar in the final product can be about 50:50 and the amorphous sugar can contain one or more of corn syrup solids DE 20, DE 28, DE 36, DE 42, DE 43, DE 90 to DE 95, maltose corn syrup DE 65, polydextrose, and inulin.

The invention further relates to methods of producing a chocolate composition containing amorphous sugar comprising combining cocoa powder, cocoa liquor, or cocoa product with 1 part non-fat dry milk and 1 part amorphous sugar with 4 parts water, boiling the mixture until the water evaporates, and drying the mixture to 10% moisture to create a powder. The resulting powder is then combined with sugar and cocoa butter at 40° C. The resulting composition contains 20% powder, 45% sugar and 35% cocoa butter.

In another general aspect of the confectionery or food compositions of the invention, the composition, which can be an ingredient or a final food product, comprises a cocoa product, such as cocoa powder, cocoa liquor, or mixture of cocoa products; an appropriate fat or mixture of fats, such as cocoa butter or cocoa butter equivalents; and an amorphous solid or composition. The amorphous solid or composition is generally present in the final composition and detectable as an amorphous structure, as shown in the Figures. The amorphous solid or composition can be made of a variety of edible or food ingredients or compounds. An amorphous solid or composition can also be contrasted with the typical crystalline products used in confectionery manufacture, such as crystalline sugars. By replacing or substituting crystalline sugars, for example, during at least one point in the manufacturing process, the invention also allows the addition or retention of moisture in the food product or ingredient, which reduces costs and allows greater flexibility in final product or ingredient properties. The amorphous solid or composition and/or the confectionery composition is generally produced to have a glass transition temperature (Tg) of about room temperature or higher, or about 20° C. or higher, or about 25° C. or higher.

In any embodiment of the invention, the food composition or ingredient can also contain one or more crystalline sugar, preferably sucrose. In a preferred embodiment, the amorphous solid or composition consists essentially of a corn syrup solid, meaning one of more corn syrup solids is used together with food or edible ingredients that do not change the basic characteristics of the amorphous solid or composition and does not, or substantially does not, change the amorphous solid into a crystalline solid. It is known that certain compositions can be converted from an amorphous state to a crystalline state during a food manufacturing process. In one aspect of the invention, this conversion is substantially avoided or prevented in order to use an amorphous solid or composition. In another aspect, an amorphous solid or composition is an edible ingredient wherein a detectable amorphous structure is found, as shown in the Figures. In yet another aspect, an amorphous solid or composition additionally or alternatively has a glass transition temperature (Tg) of about 20° C. or higher. The examples show a non-limiting group of specific amorphous solids and compositions using corn syrup solids or fruit purees. Many other methods and ingredients can be used to prepare an edible, amorphous solid for use in this invention. Also, and as shown in the examples, the amorphous solid or composition and/or the final food or confectionary product or composition of the invention can comprise one or more sweeteners, non-nutritive sweeteners, and blends of sweeteners that are known in the art or available for use. The sweeteners can include polydextrose, inulin, polyols, sorbitol, maltodextrin, and sucralose, for example.

In a general aspect, an amorphous solid or composition as used in the invention can contain or consist essentially of a corn syrup solid, such as one or more of corn syrup solids DE 20, DE 28, DE 36, DE 42, DE 43, DE 90, and DE 95, maltose corn syrup DE 65, polydextrose, and inulin. It can also contain other edible or food ingredients or compounds, as shown in the Figures and described in the Examples. The preferred amorphous solid or composition consists essentially of corn syrup solid DE 42, such that the basic amorphous characteristics of the corn syrup are retained through processing. As in other chocolate or food products, the compositions of the invention can contain emulsifiers, lecithin or PGPR, or a combination of emulsifiers, as well as milk, water, concentrated milk, evaporated milk, sweetened condensed milk, dried milk, skim milk, concentrated skim milk, evaporated skim milk, sweetened condensed skim milk, whey protein, non fat milk protein, whole milk powder milk solid or milk powder. Furthermore, the compositions of the invention can contain cocoa butter, a composition comprising cocoa butter, a vegetable fat, a cocoa butter equivalent, or a composition comprising one or more of fractionated and/or hydrogenated and/or interesterified palm kernel oil, palm oil, coconut oil, cotton seed oil, sunflower oil, canola oil, and corn oil. The amorphous solid or composition can also contain cocoa solids and/or fruit puree.

A preferred embodiment is a composition that forms a milk chocolate coating, enrobing, or filler ingredient in a confectionery product. As is known in the art, specific cocoa containing products or ingredients can be used, such as those where level of polyphenols or antioxidants are enhanced, preserved, or enriched during processing as compared to conventional cocoa.

As shown in the Examples in particular, the invention also encompasses a process where a mixture containing an amorphous solid is produced and then added to other confectionery ingredients or chocolate ingredients before refining, conching, or molding. The process or method can also include heating, evaporation, vacuum treatment, or other method of removing or reducing moisture content. As in other aspects, removing moisture from the food composition or ingredient can be used to reach a desired viscosity.

In another embodiment, the invention relates to a method of producing a chocolate composition containing amorphous sugar, the method comprising selecting a ratio of crystalline sugar to amorphous sugar to be used during production such that the final composition has a glass transition temperature of at least room temperature and incorporating the crystalline sugar and amorphous sugar into chocolate. As noted, the ratio selected can vary and can even be up to 100% amorphous sugar or a combination of more than one amorphous sugar.

BRIEF DESCRIPTION OF THE FIGURES

The patent or application file contains at lease one drawing executed in color. Copies of this patent or patent application publication with color drawing(s) will be provided by the Office upon request and payment of the necessary fee.

FIGS. 1-5 show photomicrographs, more particularly polarized light microscopy photographs, of samples that can be produced using the invention. FIG. 1 is a photomicrograph of a sample of a composition of the invention in mineral oil. The microstructures labeled (1) are corn syrup/cocoa solids and the microstructures labeled (2) are sucrose crystals. One of skill in the art can easily detect the differences between the crystallized sugar and the amorphous sugar, as well as detect the presence of amorphous sugar. The continuous phase present for microscopy is about 10% cocoa butter and 90% mineral oil.

A CD version of the color images is also submitted with the application in order to view the images noted in the Figures above.

DETAILED DESCRIPTION

Throughout this disclosure, applicant refers to texts and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources. The description and examples that follow are merely exemplary of the scope of this invention and content of this disclosure and do not limit the scope of the invention. In fact, one skilled in the art can devise and construct numerous modifications to the examples listed below without departing from the scope of this invention. In general, and as used in this invention, the various chocolate and cocoa-containing products and compositions noted here refer to the terms as used in Minifie (Chocolate, Cocoa, and Confectionery, 3d ed., Aspen Publishers), specifically incorporated herein by reference.

Figure 3:
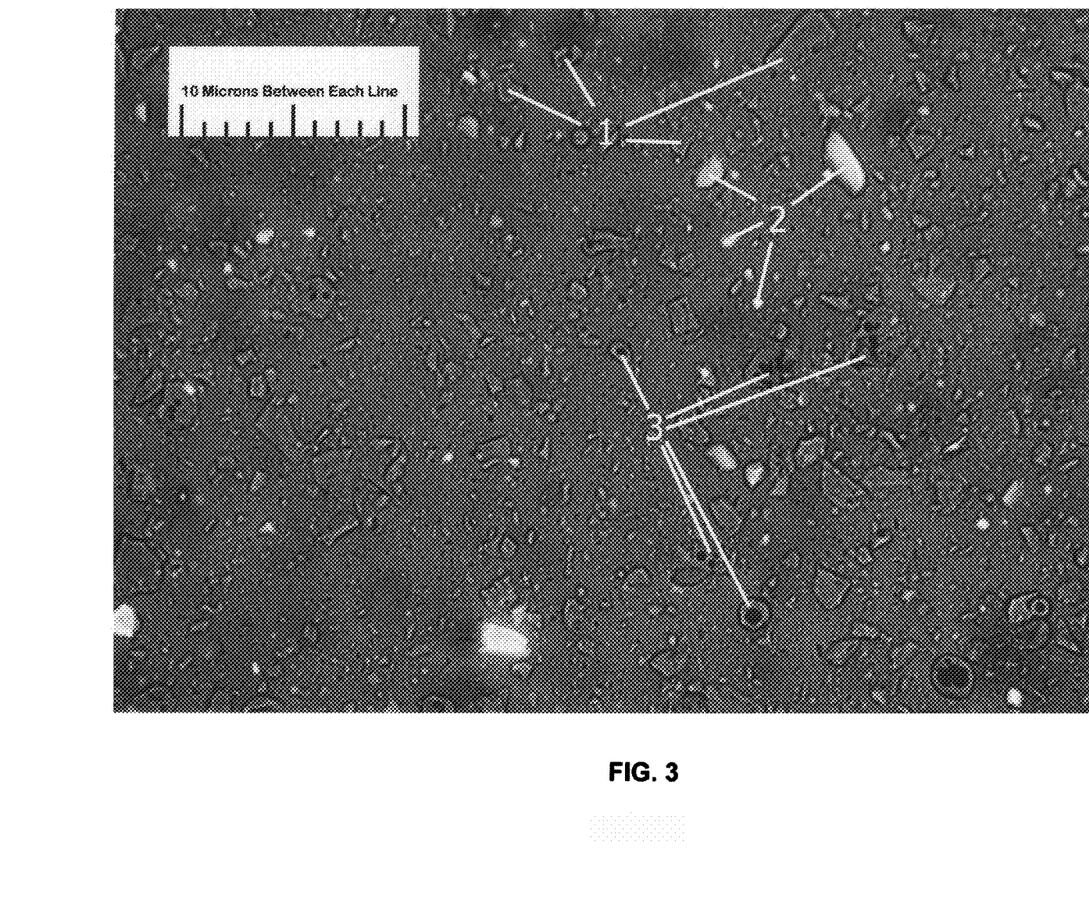
FIG. 3 is a photomicrograph of a white chocolate sample of the invention produced using amorphous sugar and peach puree. Corn syrup and peach fruit puree are indicated at (1); sucrose crystals at (2); and milk solids at (3). The continuous phase is 10% cocoa butter and 90% mineral oil.
Figure 4:
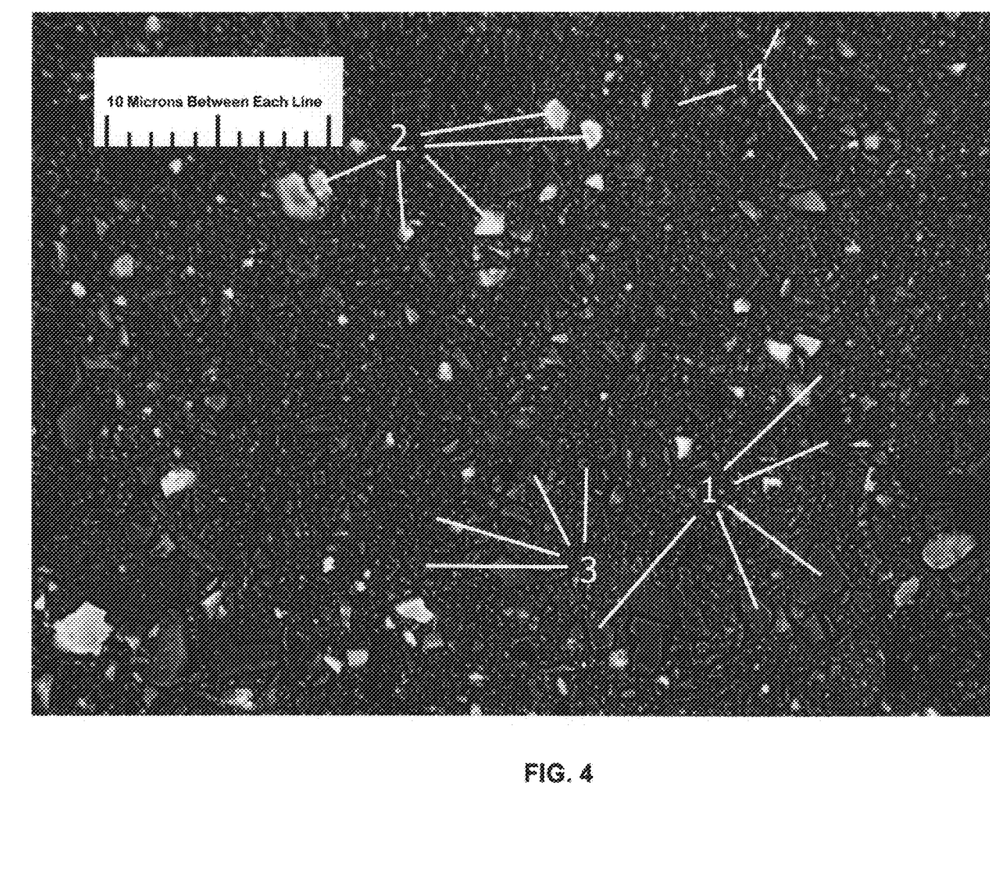
FIG. 4 is a photomicrograph of a chocolate sample of the invention produced using amorphous sugar and pear puree. Corn syrup and pear fruit puree are indicated at (1); sucrose crystals at (2); milk solids at (3); and cocoa solids at (4). The continuous phase is 10% cocoa butter and 90% mineral oil.
Figure 5:
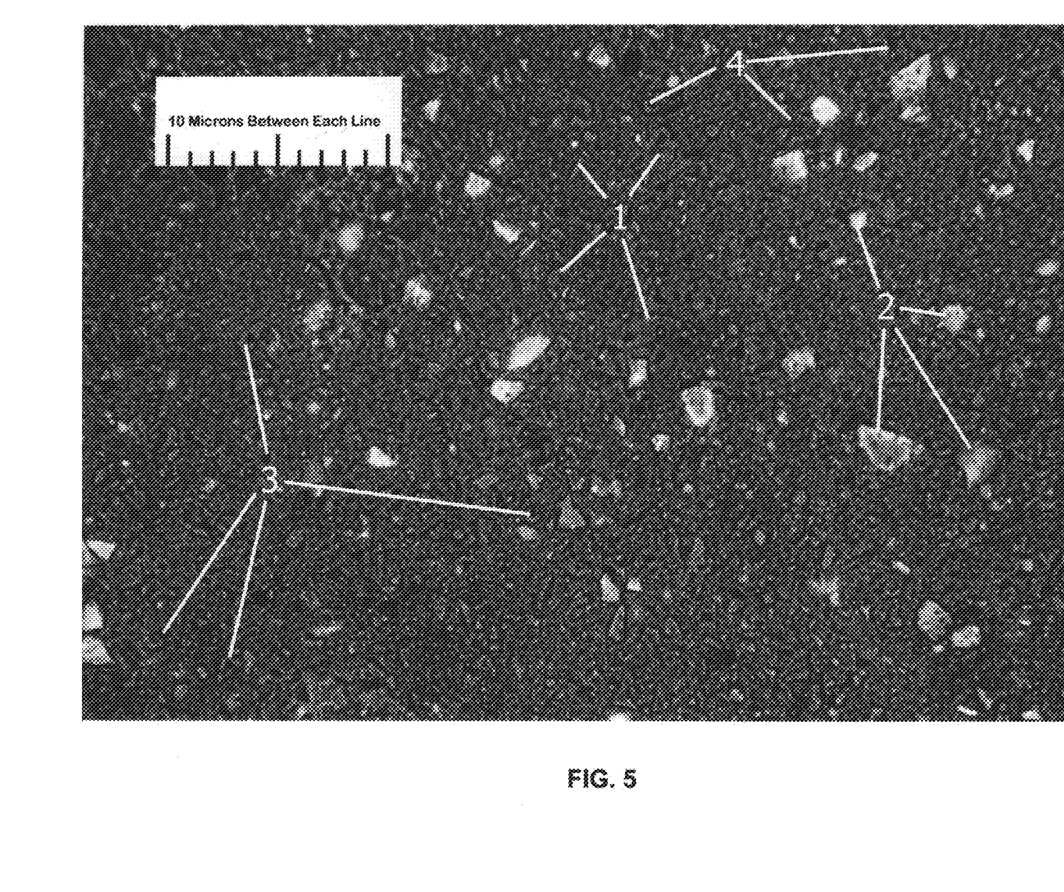
FIG. 5 is a photomicrograph of a chocolate sample of the invention produced using amorphous sugar and strawberry puree. Corn syrup and strawberry fruit puree are indicated at (1); sucrose crystals at (2); milk solids at (3); and cocoa solids at (4). The continuous phase is 10% cocoa butter and 90% mineral oil.
Figure 6:
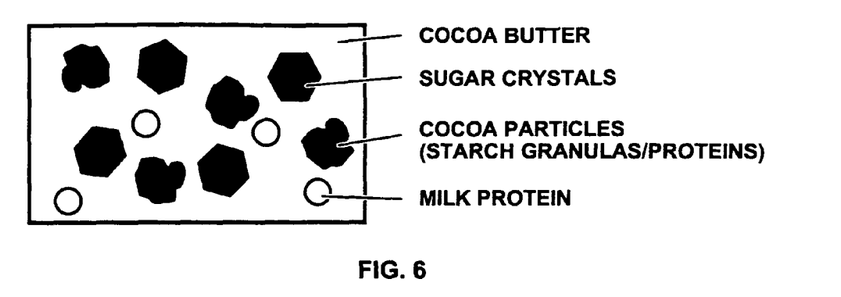
FIG. 6 is a schematic representing the microstructure of a conventional chocolate or chocolate composition.
Figure 7:
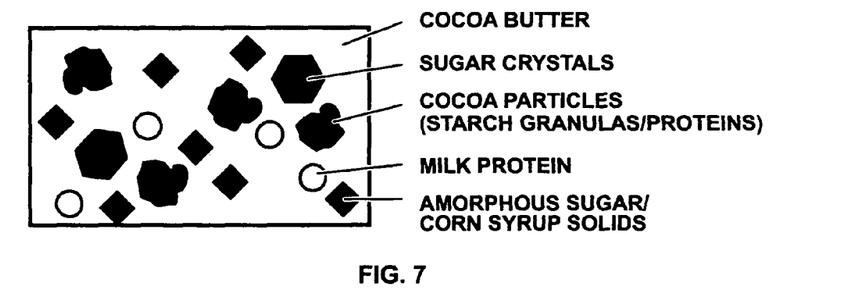
FIG. 7 is a schematic representing the microstructure when, as in one of the methods and compositions of the invention, an amorphous sugar such as a corn syrup solid is used to replace a percentage of the sugar present. This aspect typically follows the conventional chocolate mixing and production methods.
Figure 8:
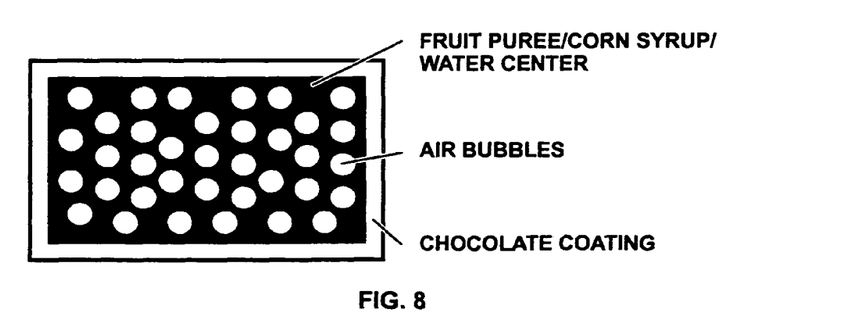
FIG. 8 a schematic representing the microstructure of another embodiment of the invention, wherein a combination of fruit puree and amorphous sugar is aerated to produce a composition useful as a filler for chocolate products. The Tg for the center composition can be above room temperature according to the invention.
Figure 9:
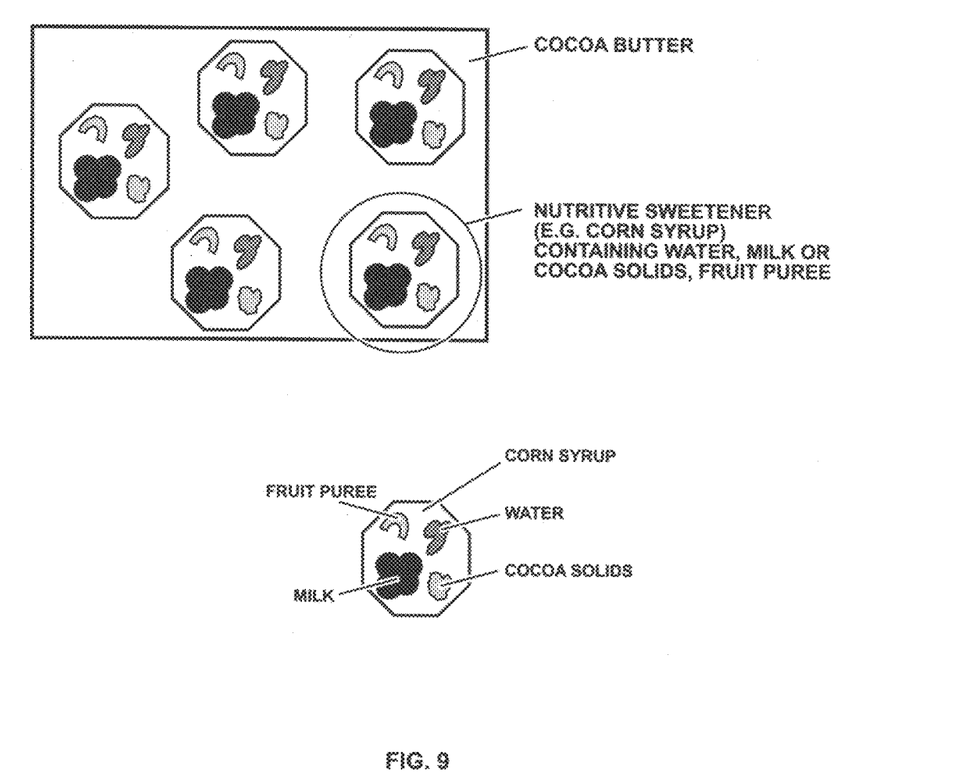
FIG. 9 is a schematic representing the microstructure of another embodiment of the invention, where an amorphous solid of amorphous sugar, with or without crystalline sugar, is in combination with milk solids, cocoa solids and optionally a fruit puree, and the amorphous solid combination added to a fat composition, such as one containing cocoa butter. The use of amorphous sugars, such as one of more of corn syrup solids, high maltose or high fructose corn syrup, results in a final chocolate product having a Tg above room temperature.

In one aspect, the invention provides a chocolate composition wherein amorphous sugar wholly or partially replaces crystalline or crystallized sugar. Amorphous sugars that are suitable for this invention include corn syrup solids DE 20, DE 28, DE 36, DE 42, and DE 43, maltose corn syrup DE 65, polydextrose, inulin (fructo-oligosaccharides) and corn syrup DE 90-95. Amorphous solids can also be produced by combining milk solids with amorphous sugars or corn syrups and cocoa or fruits. Fruits or fruit purees or and/or fruit extracts in an amorphous state are also suitable for use in this invention, as shown in FIGS. 3,-5, 8, and 9, for example. Thus, incorporating an amorphous solid into a chocolate composition can also be used to produce an ingredient or final product having a desired texture, viscosity, moisture level, and/or glass transition temperature.

Figure 1:
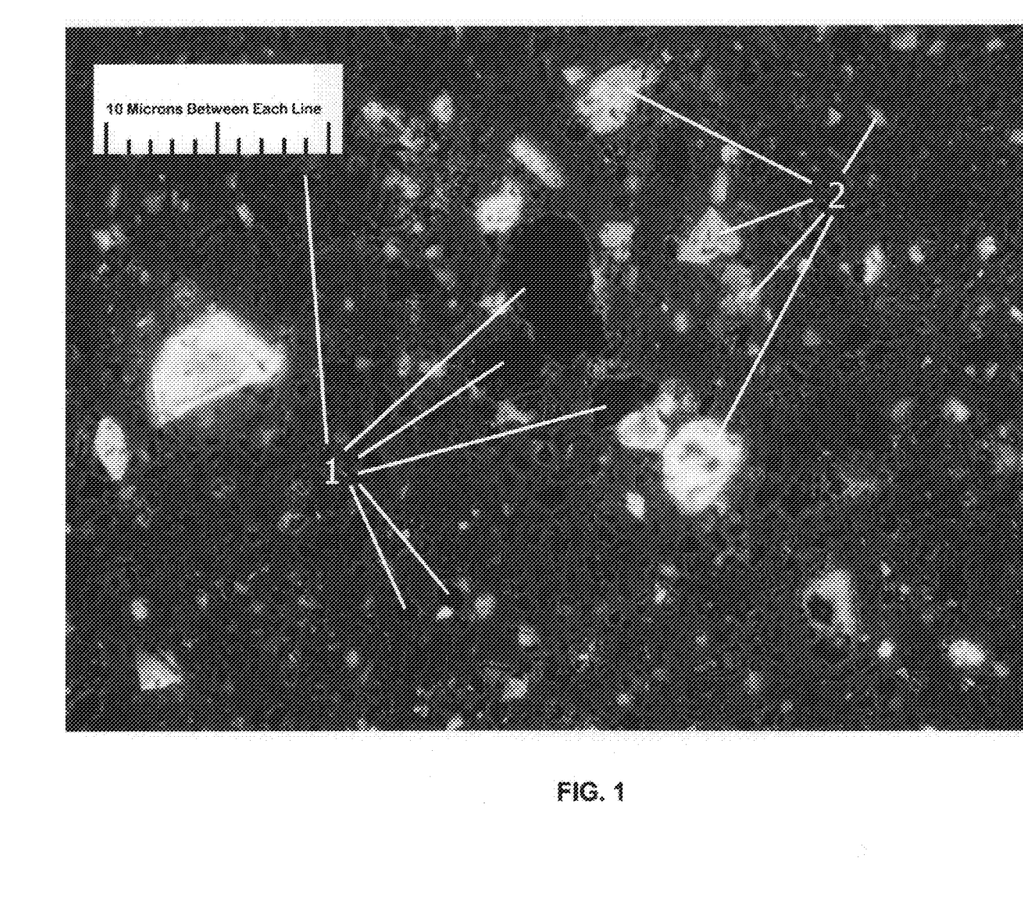
Figure 2:
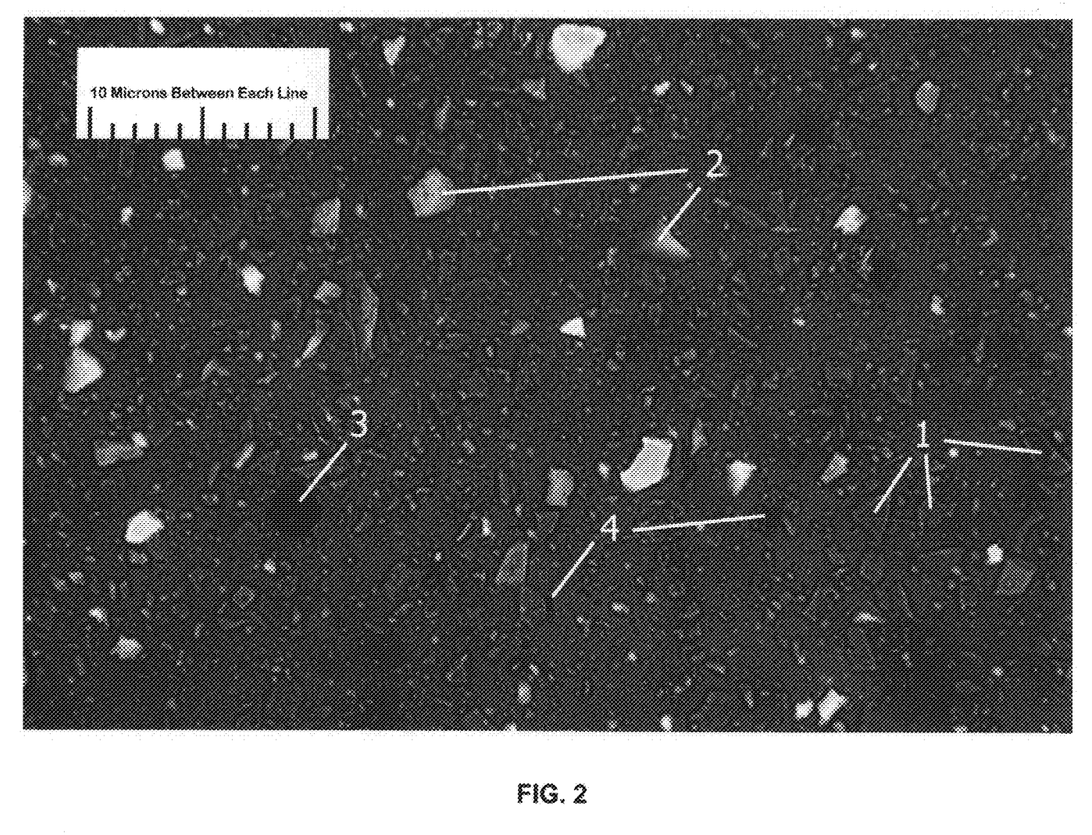
FIG. 2 is a photomicrograph of a sample of milk chocolate produced using the methods of the invention by adding amorphous sugar. Corn syrup solids are indicated at (1); sucrose crystals at (2); milk solids at (3); and cocoa solids at (4). The continuous phase is 10% cocoa butter and 90% mineral oil.

Another aspect of the invention relates to chocolate compositions comprising amorphous sugar in combination with milk solids, cocoa solids or fruit purees. Other sugar syrups, in addition to the ones mentioned above, may be suitable for combining sugar syrup with milk solids, cocoa solids or fruit purees. Amorphous sugar and corn syrups in particular are not used in chocolate manufacture (see Chapter 3 in "Industrial Chocolate Manufacture and Use," 3d Edition, 1999 Blackwell Science, edited by S. T. Beckett). In fact, it has been reported that even when amorphous sugar is used in the production of chocolate, the amorphous sugar, such as sucrose or dextrose, crystallizes during processing and is not present as amorphous structures in the final product (Gloria and Sievert, J. Agric. Food Chem., vol. 49: 2433-36 (2001)). In their study, Gloria and Sievert suggest that sucrose crystals act as nucleation sites favoring the crystallization process, thus the presence of crystalline sucrose accelerates the crystallization of amorphous sucrose in chocolate processing. Contrary to this study, this disclosure shows that the methods of the invention can be employed to produce chocolate with amorphous sugar and/or amorphous solids in the final product (see photomicrographs in FIGS. 1-5). Accordingly, advantageous and surprising results can be achieved through the use of the invention in various food and chocolate production methods.

In a further embodiment, the invention relates to a chocolate composition comprising amorphous sugar and crystallized sugar wherein the ratio of amorphous sugar to crystallized sugar is such that the combination has a glass transition temperature (Tg) of at least room temperature. Being able to determine the glass transition temperature of different ratios of sucrose and corn syrup, or more generally amorphous sugar, at various moisture levels has important implications for the processing of chocolate.

The effect of different ratios of sucrose:corn syrup, or even different ratios of nutritive sweetener:corn syrup, as well as the moisture content on the Tg can be measured by differential scanning calorimetry (DSC) and dynamic mechanical thermal analysis (DMTA), as discussed here. A direct correlation exists between DSC glass transition temperatures (enthalpy) and DMTA glass transition temperatures (structure). At all ratios of sucrose:corn syrup mixtures, for example, the Tg at different moisture contents can be determined or predicted and used to improve the manufacturing process from a variety of viewpoints. This information can be used to select particular amounts of sucrose, for example, that can be replaced with one or more amorphous sugars in a confectionery composition, or during the production or manufacture of a confectionery or food product, while controlling the Tg and the mouthfeel and other taste properties.

EXAMPLES

Example 1

To demonstrate general techniques in measuring the compositions of the invention, samples are prepared using various ratios of crystalline sucrose (such as pure cane granulated sugar, Domino, Yonkers, N.Y.) and corn syrup (such as corn syrup 43 DE IX, Cargill, Inc., Dayton, Ohio). As an example, 750 grams of sucrose, 250 grams of corn syrup (20% moisture), and 300 grams of water are added to a pan. The mixture is heated using an electric element (Bottom Line Technologies, Inc. Lawrenceburg, Ind.) set to 204° C. and continuous stirring (setting of 20) using a four-blade paddle (Bottom Line Technologies, Inc. Lawrenceburg, Ind.) attached to an automatic stirring mechanism (Bottom Line Technologies, Inc. Lawrenceburg, Ind.). Temperature of the mixture is monitored using a portable thermocouple (Barnant). Samples are collected using plastic syringes during the cooking process. Samples are typically collected at temperatures of 105° C., 107° C., 109° C., 111° C., 113° C., 118° C., 125° C., 135° C. and 150° C.

To prepare anhydrous samples of each sucrose:corn syrup formulation, the samples are cooked to 130° C., poured into a slab on the bench top, cooled to room temperature, and ground in a Krups coffee mill or coffee bean grinder. Ground samples are placed in a Cole-Parmer vacuum oven at 95° C., which is attached to a Freezemobile 12 (Virtis, N.Y.) freeze dryer. In this system, the vacuum is 430 millitorr and the temperature of the freeze dryer drum is −60° C. Samples are dried for at least a week. To prevent moisture uptake samples are placed directly in pre-weighed DSC pans and capped at the oven. Duplicate samples for moisture analysis can be collected in test tubes and capped in a similar way.

Moisture analysis is performed on the samples using a 701 Karl Fischer Titrino Titrator (Brinkmann, USA) equipped with a 703 Ti Stirrer Stand (Brinkmann, USA) and a PT-MR2100 Polytron Homogenizer (Kinematica, Switzerland).

Differential Scanning Calorimetry measurements can be made using a DSC Q1000 (TA Instruments, Inc.) equipped with an autosampler and a refrigerated cooling system. Data can be collected on a Dell Pentium computer using the Advantage for Q Series Version (1.3) software. Data analysis is performed using the Universal Analysis 2000 Version (35B) software.

Dynamic Mechanical Thermal Analysis measurements are made using a DMA7e (Perkin Elmer, USA) equipped with a refrigerated cooling system. Data collection and analysis is performed on a Dell Pentium II computer using Perkin Elmer's Pyris Series DMA 7 Version 3.01 Rev. A software. DMTA is calibrated for temperature using indium as standard (melting point, 156.6° C.). Samples are placed in the 10 mm hole of a 20 mm by 2 mm circular washer before placing them on the sample stage of the DMTA. Parchment paper is used to cover the bottom of the washer. At a frequency of 1 Hz, static and dynamic forces applied to the sample during testing are 4,200 mN and 3,800 mN, respectively. Typically, DMTA data is collected at a rate of 2° C./min between −50° C. and 80° C. The maximum of the tan δ and the inflection temperature of the probe position in the thermogram is used as the glass transition temperature.

DSC glass transition temperatures of various sucrose:corn syrup blends can be modeled as a function of moisture content.

Using this information allows one to conduct experiments varying the Tg and properties of various food and confectionery products and compositions. In general, the corn syrup noted above can be an amorphous sugar or a combination of amorphous sugars, or a sweetener composition comprising amorphous sugar, sucrose, and other sweeteners such as non-caloric sweeteners. A preferred amorphous sugar is corn syrup solids DE 42, however others can be selected. In addition, amorphous sugar can be prepared from a fruit puree or a fruit extract, or a combination of fruit purees, by heating and panning the composition to dry and cool. As shown in the photomicrographs of FIGS. 1-5, the presence of amorphous sugar can be detected by visual inspection or microscopy, however other methods can be used.

Example 2

In order to demonstrate a composition containing an amorphous solid or composition of the invention, an exemplary mixture containing 33% corn syrup solids DE 42, 25% sucrose, 8.8% non fat dry milk, 11.7% cocoa liquor, 17.6% cocoa butter, 3.6% AMF and 0.3% lecithin is prepared. The mixture is roller refined, conched for 2.5 hours, tempered and molded into chocolates, then cooled to room temperature and packed. The resulting product possesses many of the desirable characteristics of conventional chocolate—has a similar mouthfeel and texture at room temperature. Similar compositions or the replacement of sucrose by corn syrup solids DE 42 at similar levels in existing recipes can lead directly to chocolate compositions for coating confectionery or food products. Again, the compositions of the invention possess the same or similar taste, mouthfeel and texture as compared to conventional milk chocolate. The same properties can be found using recipes and amorphous sugar and fruit puree compositions as detailed in the examples that follow.

Example 3

A mixture containing 150 g alkalized cocoa powder, 150 g non fat dry milk, and 150 g corn syrup, preferably corn syrup solids DE42, is dissolved in 700 g water and heated up to the boiling point in an open pan. The water is evaporated until the material is a high viscous, and then spread on a tray and dried to 10% moisture, then ground in a coffee grinder, resulting in a powder. The resulting powder contains or comprises an amorphous solid or composition. Then a mixture containing 20% of the above resulting powder and 45% sugar and 35% cocoa butter is prepared at 40° C., roller refined and tempered, and molded into chocolates, cooled to room temperature and packaged. The same advantageous properties noted in Example 2 can be achieved.

Example 4

Frozen strawberries are defrosted and mixed to a puree using a household mixer. A mixture containing 1417 g strawberry puree and 500 g corn syrup DE 42 is prepared and heated up to the boiling point in an open pan, causing the moisture to evaporate. When it reaches 123° C., the material is transferred to a vacuum oven and dried to 1% moisture, then ground, resulting in a pulverized material. A mixture containing 30.2% of the pulverized material, 25.8% sucrose, 12.5% liquor, 8.8% non fat dry milk, 18.8% cocoa butter, 3.5% AMF, and 0.4% lecithin is prepared. Then the mixture is roller refined, conched for 3.5 hours, tempered, molded into chocolates, cooled to room temperature and packed.

Example 5

Frozen peaches are defrosted and mixed to a puree using a household mixer. A mixture containing 865 g peach puree and 500 g corn syrup DE 42 is prepared and heated to the boiling point in an open pan, causing the moisture to evaporate. When it reaches 121° C., the material is transferred to a vacuum oven and dried to 1.2% moisture, then ground, resulting in a pulverized material. A mixture containing 30% of the pulverized material, 10% sucrose, 24% non fat dry milk, 6% lactose, 24.6% cocoa butter, 5% AMF, and 0.4% lecithin is prepared. Then the mixture is roller refined, conched for 3.5 hours, tempered, molded into chocolates, cooled to room temperature and packed.

Example 6

Canned pears in their natural juice are mixed to a puree using a household mixer. A mixture containing 1335 g pear puree and 500 g corn syrup DE 42 is prepared and heated to the boiling point in an open pan, causing the moisture to evaporate. When it reaches 116° C., the material is transferred to a vacuum oven and dried to 1.1% moisture, then ground, resulting in a pulverized material. A mixture containing 30.2% of the pulverized material, 25.8% sucrose, 12.5% cocoa liquor, 8.8% non fat dry milk, 18.8% cocoa butter, 3.5% AMF, and 0.4% lecithin is prepared. Then the mixture is roller refined, conched for 3.5 hours, tempered, molded into chocolates, cooled to room temperature and packed.

The examples presented above and the contents of the application define and describe examples of the many food and confectionery compositions, ingredients, and products that can be produced according to the invention. None of the examples and no part of the description should be taken as a limitation on the scope of the invention as a whole or of the meaning of the following claims.

The invention claimed is:

1. A chocolate food or confectionery composition comprising
   a) cocoa powder or cocoa liquor, or a mixture thereof;
   b) cocoa butter or cocoa butter equivalents, or a mixture thereof; and
   c) an amorphous solid comprising (i) an amorphous carbohydrate sweetener consisting essentially of one or more corn syrup solids, (ii) water and (iii) a second sweetener comprising a crystalline sugar, wherein the ratio of amorphous carbohydrate sweetener to the crystalline sugar present is approximately 50:50, and
wherein the amorphous solid is detectable as an amorphous structure in the food or confectionery composition, and the amorphous solid or composition has a glass transition temperature (Tg) of about 20° C. or higher.

2. The composition of claim 1, wherein the amorphous carbohydrate sweetener is selected from one or more of corn syrup solids DE 20, DE 28, DE 36, DE 42, DE 43, DE 90, and DE 95, maltose corn syrup DE 65, polydextrose, and inulin.

3. The composition of claim 1, wherein the amorphous carbohydrate sweetener consists essentially of corn syrup solid DE 42.

4. The composition of claim 3, wherein the Tg is about 25° C. or higher.

5. The composition of claim 1, further comprising lecithin or PGPR, or both.

6. The composition of claim 1, further comprising a milk solid or milk powder.

7. The composition of claim 6, wherein the milk solid or milk powder forms at least part of the amorphous solid.

8. The composition of claim 7, which is a milk chocolate coating.

9. A food or confectionery product comprising the milk chocolate coating of claim 8.

10. The composition of claim 6, which is a milk chocolate coating.

11. A food or confectionery product comprising the milk chocolate coating of claim 10.

12. The composition of claim 1, wherein the crystalline sugar comprises sucrose.

13. The composition of claim 1, wherein the chocolate food or confectionery composition, cocoa powder, cocoa liquor, or mixture thereof contains an enhanced level of polyphenols or antioxidants compared to conventional cocoa.

14. The composition of claim 1, wherein the amorphous carbohydrate sweetener further comprises a fruit puree or fruit extract.

15. The composition of claim 14, wherein the amorphous solid further comprises a milk solid or milk powder.

16. The composition of claim 15, further comprising lecithin or PGPR, or both.

17. The composition of claim 15, wherein the composition is a milk chocolate product or confectionery ingredient.

18. The composition of claim 14, wherein the corn syrup solid is one or more of corn syrup solids DE 20, DE 28, DE 36, DE 42, DE 43, DE 90, and DE 95, maltose corn syrup DE 65, polydextrose, and inulin.

19. The composition of claim 14, wherein the fruit puree or fruit extract comprises one or more of peach, strawberry, or pear fruit.

20. The composition of claim 19, wherein the amorphous solid further comprises a corn syrup solid.

21. The composition of claim 20, further comprising crystalline sugar.

22. The composition of claim 14, wherein the chocolate food or confectionery composition, cocoa powder, cocoa liquor, or mixture thereof contains an enhanced level of polyphenols or antioxidants compared to conventional cocoa.

23. The composition of claim 1, wherein the Tg is about 21° C. to about 25° C.

24. The composition of claim 1, wherein the Tg is about 25° C. or higher.

* * * * *